United States Patent
Guo et al.

(10) Patent No.: US 11,073,848 B2
(45) Date of Patent: Jul. 27, 2021

(54) METHOD FOR RECOGNIZING MOTOR SYSTEM

(71) Applicant: AAC Technologies Pte. Ltd., Singapore (SG)

(72) Inventors: Xuan Guo, Shenzhen (CN); Zheng Xiang, Shenzhen (CN); Tao Li, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 102 days.

(21) Appl. No.: 16/703,897

(22) Filed: Dec. 5, 2019

(65) Prior Publication Data

US 2020/0209900 A1     Jul. 2, 2020

(30) Foreign Application Priority Data

Dec. 31, 2018   (CN) .......................... 201811651546.8

(51) Int. Cl.
     *G05D 19/02*      (2006.01)
     *B06B 1/04*      (2006.01)
     (Continued)

(52) U.S. Cl.
     CPC .............. *G05D 19/02* (2013.01); *B06B 1/045* (2013.01); *G06F 3/016* (2013.01); *H04M 1/72403* (2021.01)

(58) Field of Classification Search
     CPC ... G05D 19/02; G05D 19/00; H04M 1/72403; H04M 1/72454; G06F 3/016; B06B 1/045; G01H 1/00
     See application file for complete search history.

(56) References Cited

U.S. PATENT DOCUMENTS 9,690,383 B1 *   6/2017   Robert ................ G06F 3/04883
2009/0096406 A1 *   4/2009   Flickinger .......... G05B 23/0283
                                                                                                         318/565

(Continued)

FOREIGN PATENT DOCUMENTS

CN            106199185 A1    12/2016

OTHER PUBLICATIONS

Kang, Minju et al., A method of Frequency Response Analysis of Mechanical Systems Combining Swept-Sine and Stepped-Sine Excitation, Jul. 18, 2017, IEEE conference on Real-Time Computing, Okinawa JP, Internet URL:<https://ieeexplore.ieee.org/abstract/document/8311947> (Year: 2017).*

Glentis A., George-Othon et al., "Efficient Algorithms for Volterra System Identification", IEEE Transactions on Signal Processing, vol. 47 No. 11, Nov. 1999, Internet URL:<https://ieeexplore.ieee.org/abstract/document/796438> (Year: 1999).*

(Continued)

*Primary Examiner* — Kenneth M Lo
*Assistant Examiner* — Jonathan Michael Skrzycki
(74) *Attorney, Agent, or Firm* — W&G Law Group LLP

(57) ABSTRACT

A method for recognizing a motor system is provided. The method includes steps of: establishing a functional series filter model for describing a motor system; generating a logarithmic sweep signal; feeding the logarithmic sweep signal to the motor system and obtaining, by an accelerometer, a vibration acceleration output by the motor system; generating an inverse signal of the logarithmic sweep signal generated; convolving the vibration acceleration with the inverse signal to obtain a one-dimensional impulse response sequence; intercepting the one-dimensional impulse response sequence by using a window function to obtain impulse response sequences; solving kernel functions according to the impulse response sequences, substituting the kernel functions into a recognition formula of the motor system, and describing and identifying the motor system through the recognition formula.

2 Claims, 6 Drawing Sheets

(51) Int. Cl.
*G06F 3/01* (2006.01)
*H04M 1/72403* (2021.01)

(56) References Cited

U.S. PATENT DOCUMENTS

| | | | | |
|---|---|---|---|---|
| 2009/0265138 | A1* | 10/2009 | Liu | H04M 19/04 |
| | | | | 702/183 |
| 2012/0041695 | A1* | 2/2012 | Baldwin | G01N 29/11 |
| | | | | 702/56 |
| 2014/0090472 | A1* | 4/2014 | Lysen | G01H 1/003 |
| | | | | 73/587 |
| 2014/0333235 | A1* | 11/2014 | Tam | H02P 25/032 |
| | | | | 318/114 |
| 2019/0005781 | A1* | 1/2019 | Kobayashi | G06F 3/016 |
| 2020/0211337 | A1* | 7/2020 | Grant | G06F 3/016 |

OTHER PUBLICATIONS

Parali, Levent et al., "Vibration Modelling of Piezoelectric Actuator (PEA) Using Simulink Software", 4th ICEEE, Apr. 10, 2017, Internet URL:<https://ieeexplore.ieee.org/document/7935811> (Year: 2017).*

Burton, Trevor G. et al., "Nonlinear System Identification Using a Subband Adaptive Volterra Filter", IEEE Transactions on Instrumentation and Measurement, vol. 58 Iss. 5, May 2009, Internet URL:<https://ieeexplore.IEEE.org/abstract/document/4776440> (Year: 2009).*

PCT search report dated Jan. 2, 2020 by SIPO in related PCT Patent Application No. PCT/CN2019/111096 (5 Pages).

PCT Suggestion dated Jan. 2, 2020 by SIPO in related PCT Patent Application No. PCT/CN2019/111096 (4 Pages).

* cited by examiner

METHOD FOR RECOGNIZING MOTOR SYSTEM

TECHNICAL FIELD

The present disclosure relates to the field of signal processing, and in particular, to a method for recognizing a motor system using a one-dimensional Volterra filter.

BACKGROUND

With a development of science and technology, audiovisual and other senses have been difficult to meet people's demands, and tactile feedback has entered the public's vision field as a direct sense. A tactile actuator with a motor being a core and an electronic device (such as a cellphone, a tablet, or a motor central device) being a carrier can provide a customized tactile experience by designing its specific waveform. For example, according to scenarios in the game, different sound sources can correspond to different vibrations, which makes people recognize targets more directly and fast in the game and at the same time obtain higher immersion feeling. For another example, for electronic devices such as cellphones, virtual buttons can be provided with highly customized vibration waveforms to achieve special feelings of physical buttons. Recognition for motor system is essential to design a motor customized waveform.

The recognition for the motor system can be understood as determining a processing process of an input signal by a motor system, that is, when an input voltage signal is provided, an output vibration waveform of the motor can be known by recognizing an obtained processing process.

The recognition for the motor system in the related art mostly relies on a physical model, components such as a circuit structure and a magnetic drive are included. On the one hand, an analysis is cumbersome, and an error in recognition of the physical model may lead to an error of a system identification; and on the other hand, it is difficult to accurately describe a nonlinear component of a motor.

Therefore, it is necessary to provide a new method for recognizing the motor system to solve the above problems.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The technical solutions in embodiments of the present disclosure are described in the following with reference to the accompanying drawings. It should be understood that described embodiments are merely exemplary embodiments of the present disclosure, which shall not be interpreted as providing limitations to the present disclosure. All other embodiments obtained by those skilled in the art without creative efforts according to the embodiments of the present disclosure are within the scope of the present disclosure.

Figure 1:
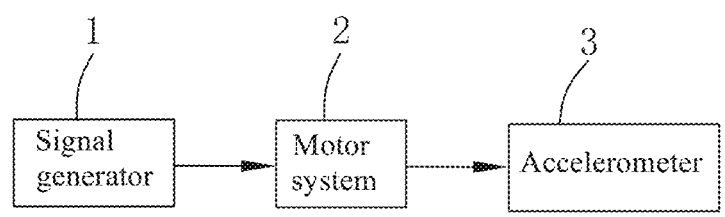
FIG. 1 is a schematic diagram of device for recognizing a motor system using a method for recognizing a motor system.

With reference to FIG. 1, an embodiment of the present disclosure provides a method for recognizing a motor system, the method can be implemented through a signal generator 1, a motor system 2, and an accelerometer 3.

The signal generator 1 inputs an excitation voltage x(n) to the motor system 2.

The motor system 2 is a motor system to be recognized. In an embodiment, the motor system 2 is regarded as a black box. An input signal is the excitation voltage x(n), and an output signal is a vibration acceleration y(n).

The accelerometer 3 is configured to collect the vibration acceleration y(n) output by the motor system 2

Figure 2:
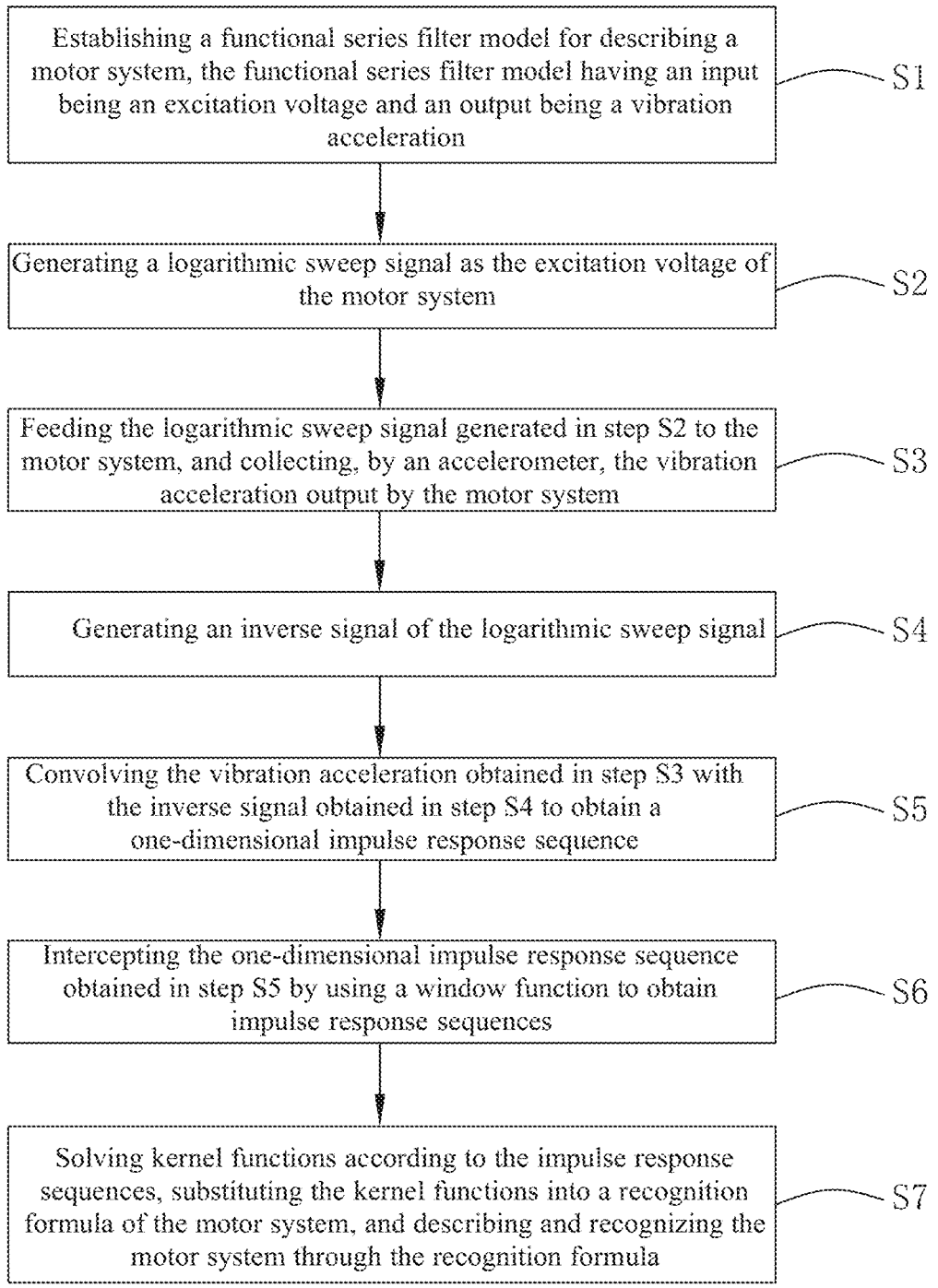
FIG. 2 is a flow chart of a method for recognizing a motor system.
Figure 3:
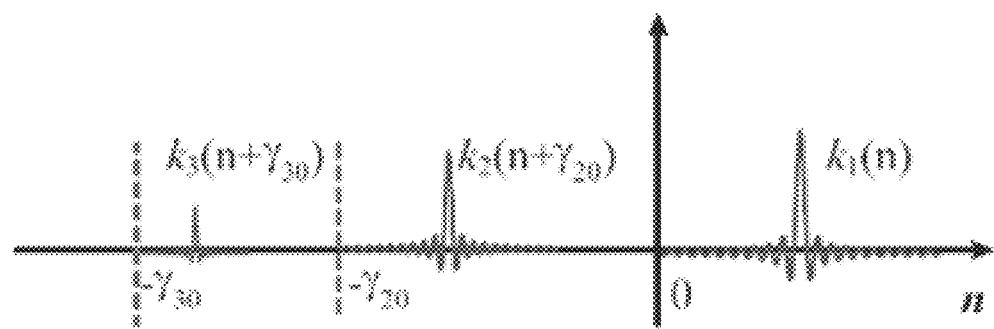
FIG. 3 is a schematic diagram of a one-dimensional impulse response sequence used in a method for recognizing a motor system.
Figure 4:
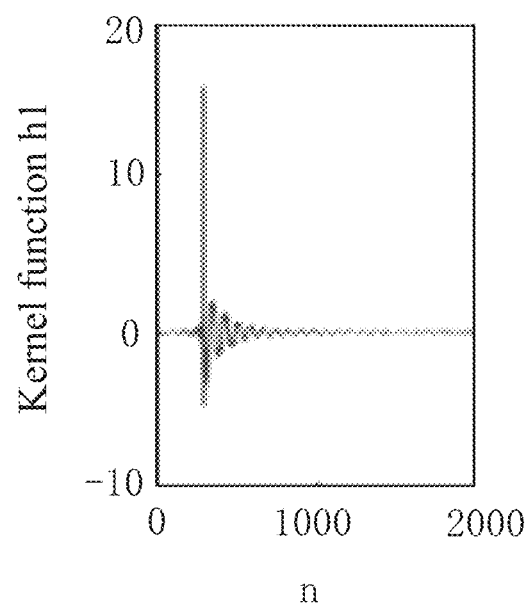
FIG. 4 is a schematic diagram of a 1st-order kernel function h1 of a method for recognizing a motor system.
Figure 5:
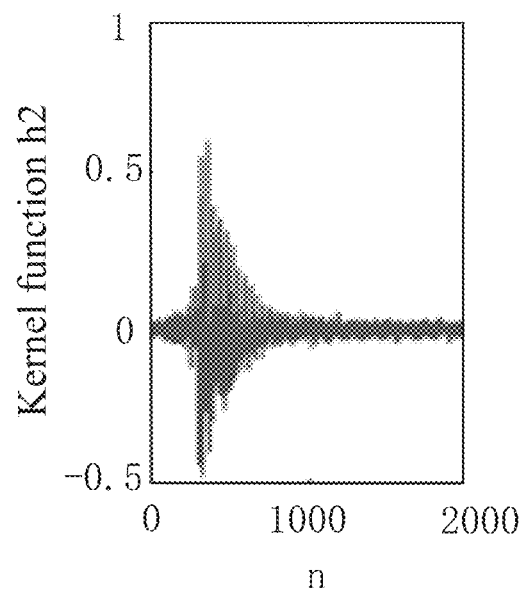
FIG. 5 is a schematic diagram of a 2nd-order kernel function h2 of a method for recognizing a motor system.
Figure 6:
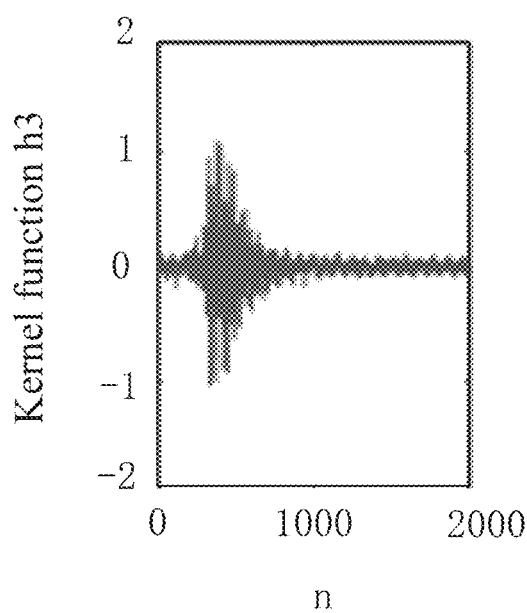
FIG. 6 is a schematic diagram of a 3rd-order kernel function h3 of a method for recognizing a motor system.
Figure 7:
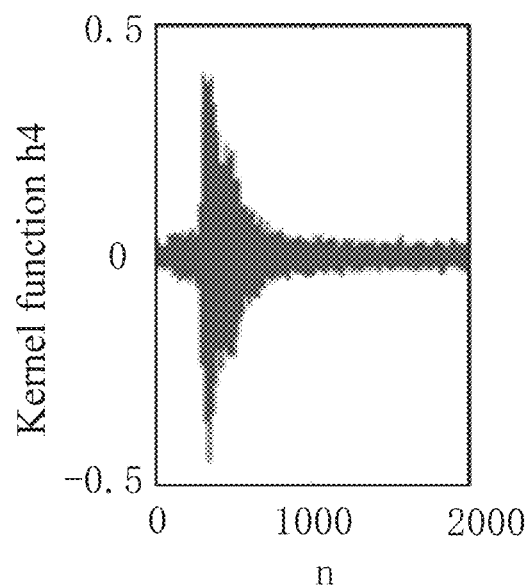
FIG. 7 is a schematic diagram of a 4th-order kernel function h4 of a method for recognizing a motor system.
Figure 8:
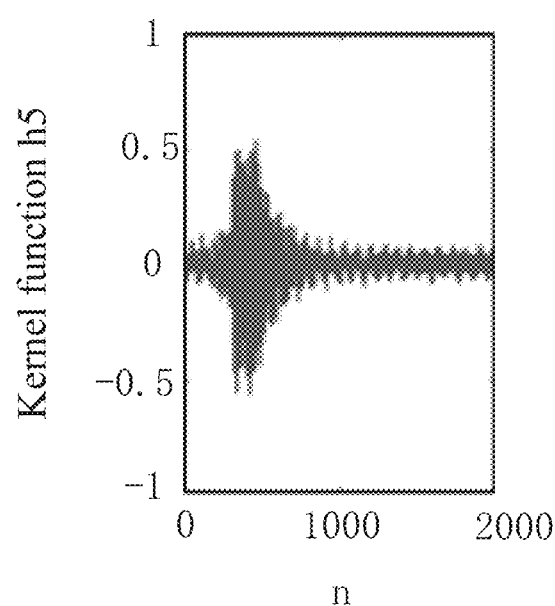
FIG. 8 is a schematic diagram of a 5th-order kernel function h5 of a method for recognizing a motor system.

With reference to FIG. 2, the method for recognizing the motor system includes following steps.

In step S1, a functional series filter model for describing the motor system is established, the functional series filter model having an input being an excitation voltage x(n) and an output being a vibration acceleration y(n), and y(n) satisfies a recognition formula (1) as follows.

$$y(n) = \sum_{i=0}^{M_1-1} h_1(i)x(n-i) + \sum_{i=0}^{M_2-1} h_2(i)x^2(n-i) + \cdots + \sum_{i=0}^{M_p-1} h_p(i)x^p(n-i) \quad (1)$$

Here, $h_p$ is a kernel function of the functional series filter model, $M_p$ is a length of a filter of a $p^{th}$-order kernel function, i is a point coordinate of a discrete-domain kernel function and is a natural number ranging from 0 to $M_p-1$, n is a positive integer, p is a positive integer, $x^p(n-i)$ represents $p^{th}$ power of an x sequence of a $(n-i)^{th}$ point coordinate;

In step S2, a logarithmic sweep signal is generated as the excitation voltage x(n) of the motor system, where x(n) satisfies a formula (2):

$$x(n) = A\sin\left\{\frac{\omega_1 T}{\ln(\omega_2/\omega_1)}\left[e^{\frac{n\ln(\omega_2/\omega_1)}{N}} - 1\right]\right\} \quad (2)$$

Here, A is an amplitude, $\omega_1$ and $\omega_2$ respectively are a starting angular frequency and an ending angular frequency of the logarithmic sweep signal, T is a signal duration of the logarithmic sweep signal, N is a total number of sampling points, and n is a positive integer.

Meanwhile, parameters satisfy a formula (3):

$$\frac{\omega_1 T}{\ln(\omega_2/\omega_1)} = \frac{\pi}{2} + 2\eta\pi \quad (3)$$

Here, $\eta = \ldots, -1, 0, 1, 2, \ldots$.

In step S3, the logarithmic sweep signal generated in the step S2 is fed to the motor system, and the vibration acceleration y(n) output by the motor system is collected by an accelerometer.

In step S4, an inverse signal of the logarithmic sweep signal is generated, and x̃(n) satisfies a formula (4):

$$\tilde{x}(n) = \frac{2\ln\left(\frac{\omega_2}{\omega_1}\right)}{A^2 T} e^{-\frac{n}{N}\ln\left(\frac{\omega_2}{\omega_1}\right)} \cdot x(-n) \quad (4)$$

In step S5, the vibration acceleration y(n) collected in the step S3 is convolved with the inverse signal x̃(n) obtained in the step S4 to obtain a one-dimensional impulse response sequence k(n); in this step, the one-dimensional impulse response sequence k(n) consists of multiple delayed impulse response sequences.

In step S6, the one-dimensional impulse response sequence k(n) obtained in the step S5 is intercepted by using a window function to obtain impulse response sequences $k_1(n)$ to $k_p(n)$.

$$\begin{cases} k_1(n) = k(n) \cdot [u(n) - u(n - M_1)] \\ k_2(n) = k(n) \cdot [u(n + \gamma_{20}) - u(n + \gamma_{20} - M_2)] \\ \vdots \\ k_p(n) = k(n) \cdot [u(n + \gamma_{p0}) - u(n + \gamma_{p0} - M_p)] \end{cases}$$

Here, u is a unit step function, $\gamma_{p0}$ is a constant indicating a delay amount of a $p^{th}$ impulse response and calculated as:

$$\gamma_{p0} = \frac{\ln(p)}{\ln(\omega_2/\omega_1)}.$$

In step S7, kernel functions $h_1$ to $h_p$ is solved according to the impulse response sequences, the kernel functions are substituted into a recognition formula of the motor system, and the motor system is described and recognized through the recognition formula. The kernel functions $h_1$ to $h_p$ are denoted as:

$$\begin{cases} h_1 = k_1 - 3k_3 + 5k_5 \\ h_2 = -\frac{2}{A}k_2 + \frac{8}{A}k_4 \\ h_3 = -\frac{4}{A}k_3 - \frac{20}{A^2}k_5 \\ h_4 = -\frac{8}{A^3}k_4 \\ h_5 = -\frac{16}{A^4}k_5 \\ \vdots \\ h_p = -\frac{2^{(p-1)}}{A^{(p-1)}}k_p \end{cases}.$$

Each kernel function is then substituted into the recognition formula of the motor system, and the motor system is described and identified by the recognition formula.

The motor system is recognized by the method for recognizing the motor system, a physical model is not depended on and a nonlinear component of a motor is included, which can effectively estimate the vibration waveform output by the motor and thereby makes the method for recognizing the motor system be simple and be with a high reliability.

In order to verify an actual effect of the method for recognizing the motor system, a system identification is performed by measuring the vibration acceleration of a motor based on the functional series filter model, and parameters of the motor are as shown in Table 1 as follows.

TABLE 1

| | parameter list of the motor | |
|---|---|---|
| symbol | physical meaning and unit | value |
| f1 | starting frequency of sweep signal, Hz | 20 |
| f2 | ending frequency of sweep signal, Hz | $4 \times 10^3$ |
| T | Duration of sweep signal, s | 9.3383 |
| A | amplitude of sweep signal, V | 2 |
| fs | sampling Rate, Hz | $8 \times 10^3$ |
| M | length of kernel function | $2 \times 10^3$ |
| zero_pos_offset | offset at time zero | 300 |

With reference to FIGS. 4-8, the motor is identified by performing the method for recognizing the motor system, and the kernel function is identified and obtained. In recognition of the verification, a recognition is performed through 5 orders the kernel function.

Figure 9:
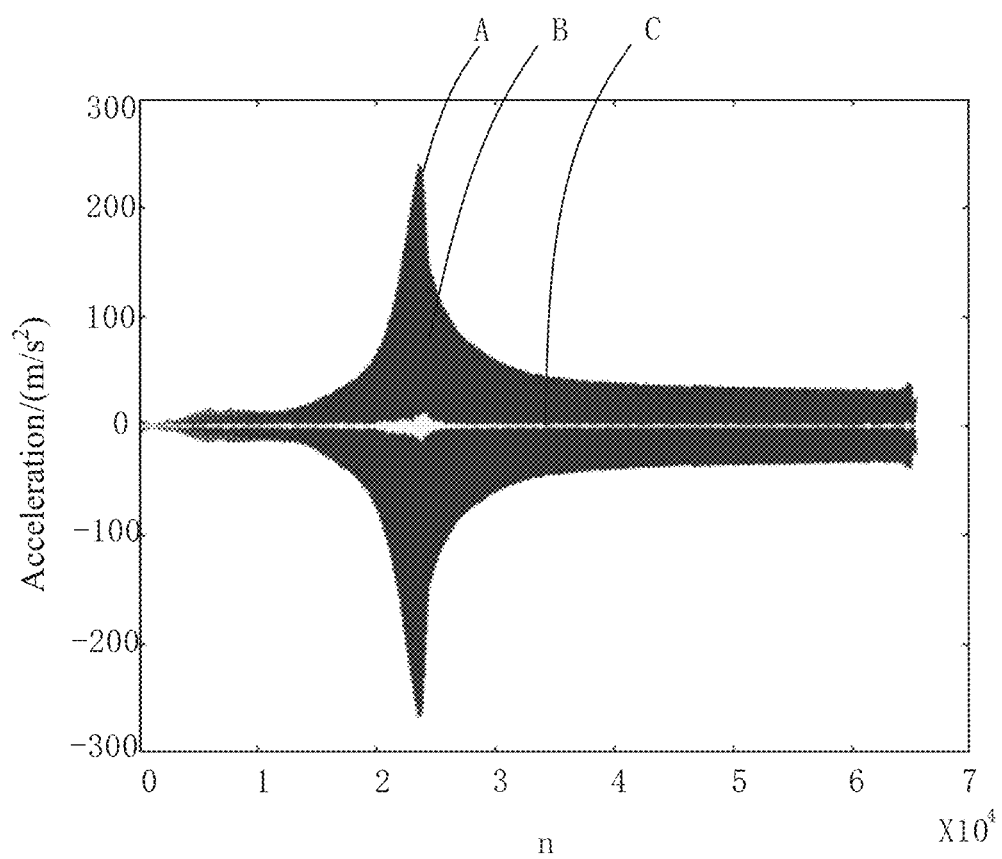
FIG. 9 is a diagram illustrating a comparison between an acceleration obtained according to a method for recognizing a motor system using a measured acceleration.

With reference to FIG. 9, the input signal x(n) is input into the motor system to recognize the motor system, and estimated vibration acceleration y'(n) output is compared with measured vibration acceleration y(n). Here, a curve A illustrates values of the measured vibration acceleration, a curve B illustrates values of the estimated vibration acceleration, and a curve C illustrates an error value thereof. An error between the estimated acceleration and the measured acceleration is 2.69%, which is a small error and indicates that the method for recognizing the motor system of the present disclosure is effective and accurate.

With the verification test described above, it can be concluded that the method for recognizing the motor system recognizes the motor system and can effectively estimate a vibration waveform output by the motor.

Compared with the related art, in the method for recognizing the motor system of the present disclosure, the functional series filter model for describing the motor system is established with the excitation voltage x(n) being the input of the functional series filter model and the vibration acceleration y(n) being the output of the functional series filter model; the logarithmic sweep signal is generated as the excitation voltage x(n) of the motor system; the generated logarithmic sweep signal is fed to the motor system, and the vibration acceleration y(n) output by the motor system is collected through the accelerometer, and then the inverse signal x̃(n) of the logarithmic sweep signal is generated; and then the vibration acceleration y(n) collected is convolved with the inverse signal x̃(n) to obtain the one-dimensional impulse response sequence k(n); then the one-dimensional impulse response sequence k(n) is intercepted to obtain impulse response sequences $k_1(n)$ to $k_p(n)$ by using the window function; then the kernel functions $h_1$ to $h_p$ is solved according to the impulse response sequences, and the kernel functions are then substituted into the recognition formula of the motor system, and the motor system is described and identified by the recognition formula. The motor system is recognized by the motor system recognition method, no physical model is depended on and a nonlinear component of the motor is included, which can effectively estimate the vibration waveform output by the motor and makes the method for recognizing the motor system be simple and be with a high reliability.

The above description is merely exemplary embodiments of the present disclosure, and is not intended to limit the scope of the present disclosure. All equivalent structures or equivalent process transformations, based on the specification and the drawings of the present disclosure, that can be directly or indirectly applied to other related technology fields are within the scope of the present disclosure.

What is claimed is:

1. A method for recognizing a motor system, comprising:
step S1 of establishing a functional series filter model for describing the motor system, the functional series filter model having an input being an excitation voltage $x(n)$ and an output being a vibration acceleration $y(n)$, wherein $y(n)$ satisfies a recognition formula (1):

$$y(n) = \sum_{i=0}^{M_1-1} h_1(i)x(n-i) + \sum_{i=0}^{M_2-1} h_2(i)x^2(n-i) + \cdots + \sum_{i=0}^{M_p-1} h_p(i)x^p(n-i), \quad (1)$$

where $h_p$ is a kernel function of the functional series filter model, $M_p$ is a length of a filter of a $p^{th}$-order kernel function, i represents a point coordinate of a discrete-domain kernel function and is a natural number ranging from 0 to $M_p-1$, n is a sampling point of the kernel function and is a positive integer, p is a positive integer, $x^p(n-i)$ represents a $p^{th}$ power of an x sequence of a $(n-i)^{th}$ point coordinate;

step S2 of generating a logarithmic sweep signal as the excitation voltage $x(n)$ of the motor system, wherein $x(n)$ satisfies a formula (2):

$$x(n) = A \sin\left\{\frac{\omega_1 T}{\ln(\omega_2/\omega_1)}\left[e^{\frac{n \ln(\omega_2/\omega_1)}{N}} - 1\right]\right\}, \quad (2)$$

where A is an amplitude, $\omega_1$ and $\omega_2$ are respectively a starting angular frequency and an ending angular frequency of the logarithmic sweep signal, T is a duration of the logarithmic sweep signal, N is a total number of sampling points, and n is a positive integer, wherein parameters simultaneously satisfy a formula (3):

$$\frac{\omega_1 T}{\ln(\omega_2/\omega_1)} = \frac{\pi}{2} + 2\eta\pi, \quad (3)$$

where $\eta = \ldots, -1, 0, 1, 2, \ldots$;

step S3 of feeding the logarithmic sweep signal generated in the step S2 to the motor system, and collecting, by an accelerometer, the vibration acceleration $y(n)$ output by the motor system;

step S4 of generating an inverse signal $\tilde{x}(n)$ of the logarithmic sweep signal, wherein $\tilde{x}(n)$ satisfies a formula (4):

$$\tilde{x}(n) = \frac{2\ln\left(\frac{\omega_2}{\omega_1}\right)}{A^2 T} e^{-\frac{n}{N}\ln\left(\frac{\omega_2}{\omega_1}\right)} \cdot x(-n); \quad (4)$$

step S5 of convolving the vibration acceleration $y(n)$ obtained in the step S3 with the inverse signal $\tilde{x}(n)$ obtained in the step S4 to obtain a one-dimensional impulse response sequence $k(n)$;

step S6 of intercepting the one-dimensional impulse response sequence $k(n)$ obtained in the step S5 by using a window function to obtain impulse response sequences $k_1(n)$ to $k_p(n)$:

$$\begin{cases} k_1(n) = k(n) \cdot [u(n) - u(n - M_1)] \\ k_2(n) = k(n) \cdot [u(n + \gamma_{20}) - u(n + \gamma_{20} - M_2)] \\ \vdots \\ k_p(n) = k(n) \cdot [u(n + \gamma_{p0}) - u(n + \gamma_{p0} - M_p)] \end{cases},$$

where u is a unit step function, and $\gamma_{p0}$ is a constant indicating a delay amount of a $p^{th}$ impulse response calculated as:

$$\gamma_{p0} = \frac{\ln(p)}{\ln(\omega_2/\omega_1)};$$

and step S7 of solving kernel functions $h_1$ to $h_p$ according to the impulse response sequences, substituting the kernel functions into the recognition formula of the motor system, and describing and recognizing the motor system through the recognition formula, wherein kernel functions $h_1$ to $h_p$ are denoted as:

$$\begin{cases} h_1 = k_1 - 3k_3 + 5k_5 \\ h_2 = -\frac{2}{A}k_2 + \frac{8}{A}k_4 \\ h_3 = -\frac{4}{A}k_3 - \frac{20}{A^2}k_5 \\ h_4 = -\frac{8}{A^3}k_4 \\ h_5 = -\frac{16}{A^4}k_5 \\ \vdots \\ h_p = -\frac{2^{(p-1)}}{A^{(p-1)}}k_p \end{cases}.$$

2. The method for recognizing a motor system as described in claim 1, wherein in the step S5, the one-dimensional impulse response sequence $k(n)$ is composed of a plurality of delayed impulse response sequences.

* * * * *